(12) United States Patent
Saito (10) Patent No.: US 8,768,550 B2
(45) Date of Patent: Jul. 1, 2014

(54) ELECTRIC VEHICLE

(75) Inventor: Jun Saito, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 224 days.

(21) Appl. No.: 13/358,301

(22) Filed: Jan. 25, 2012

(65) Prior Publication Data

US 2012/0191281 A1 Jul. 26, 2012

(30) Foreign Application Priority Data

Jan. 26, 2011 (JP) ................................ 2011-014599

(51) Int. Cl.
*B60L 15/20* (2006.01)
(52) U.S. Cl.
USPC .......................................................... 701/22
(58) Field of Classification Search
USPC .......................................................... 701/22
See application file for complete search history.

(56) References Cited

U.S. PATENT DOCUMENTS

| | | | | |
|---|---|---|---|---|
| 5,796,224 | A * | 8/1998 | Hayashi et al. | 318/139 |
| 7,117,071 | B2 * | 10/2006 | Aoki et al. | 701/22 |
| 7,407,027 | B2 * | 8/2008 | Matsuda | 180/65.27 |
| 7,911,188 | B2 * | 3/2011 | Wada et al. | 322/44 |
| 2003/0137275 | A1 | 7/2003 | Suzuki et al. | |
| 2009/0243554 | A1* | 10/2009 | Gu et al. | 320/162 |
| 2011/0241578 | A1* | 10/2011 | Kim et al. | 318/400.02 |

FOREIGN PATENT DOCUMENTS

| | | | | | |
|---|---|---|---|---|---|
| JP | 05130709 | A | * | 5/1993 | ............... B60L 9/18 |
| JP | 05236607 | A | * | 9/1993 | ............... B60L 9/18 |
| JP | 05328531 | A | * | 12/1993 | ............. B60L 11/18 |
| JP | 06253408 | A | * | 9/1994 | ............... B60L 9/18 |
| JP | 07046720 | A | * | 2/1995 | ............. B60L 15/20 |
| JP | 09093718 | A | * | 4/1997 | ............. B60L 11/18 |
| JP | 10164701 | A | * | 6/1998 | ............... B60L 3/00 |
| JP | 2000354305 | A | * | 12/2000 | ............. B60L 11/14 |
| JP | 3200885 | B2 | | 8/2001 | |
| JP | 2003-199212 | A | | 7/2003 | |
| JP | 2006067663 | A | * | 3/2006 | ............. B60L 11/14 |
| JP | 2007-137174 | A | | 6/2007 | |
| JP | 2009-234559 | A | | 10/2009 | |

OTHER PUBLICATIONS

JPO machine translation of JP 2006-67663 (original JP document published Mar. 9, 2006).*
Japanese Office Action issued Jul. 12, 2013 for corresponding JP Application No. 2011-014599 with an English Translation.
Japanese Office Action issued Apr. 5, 2013 with English translation.
Japanese Office Action issued Oct. 9, 2013 for corresponding Japanese Patent Application No. 2011-014599 with an English Translation.

* cited by examiner

*Primary Examiner* — Behrang Badii
*Assistant Examiner* — David Testardi
(74) *Attorney, Agent, or Firm* — Birch, Stewart, Kolasch & Birch, LLP (57) ABSTRACT

An electric vehicle includes: a motor configured to be driven by electric power supplied from a battery; a limit control unit configured to calculate a limit rate for limiting a requested torque requested for the electric vehicle so that an induced voltage developed by the motor is equal to or lower than a voltage of the battery; a drive torque calculation unit configured to calculate a drive torque for traveling the electric vehicle based on the requested torque and the limit rate.

11 Claims, 8 Drawing Sheets

ELECTRIC VEHICLE

BACKGROUND OF THE INVENTION

The present invention relates to an electric vehicle.

In recent years, from the viewpoint of low pollution, attention has been paid to electric vehicles such as electric cars or hybrid cars, which travel while driving motors with electric power from secondary batteries. For example, a so-called hybrid vehicle includes a battery having a plurality of secondary batteries connected in series with each other, a motor generator that operates with electric power from the battery and supplies electric power to the vehicle, and also functions as an electric generator during regeneration, and an engine that operates with fuel. The vehicle of this type is driven by an output from the engine or the motor generator, or a total output of the engine and the motor generator.

The motor generator and the battery are connected to each other through an inverter. The inverter converts a DC power supplied from the battery into an AC power, for example, under a PWM control, and supplies the AC power to the motor generator, and controls the drive of the motor generator.

As a related-art control device for the electric vehicle, there is, for example, a battery voltage adaptive electric vehicle control device that includes control means for controlling a motor voltage according to an instruction of a driver who drives an automobile and a travel speed of the automobile. The control device controls a motor voltage to change the highest speed set value for enabling the travel of the vehicle according to a battery voltage so that a travel speed falls within the highest speed set value, and also notifies the driver of the highest speed set value (for example, refer to Japanese Patent No. 3200885). The control device disclosed in Japanese Patent No. 3200885 can provide the electric automobile that is safe and high in reliability by notifying the driver of a change in performance of the electric automobile driven by the motor.

In the control device disclosed in Japanese Patent No. 3200885, even when the battery voltage is reduced to a given value or lower, safe driving can be conducted according to the performance by notifying the driver of a change in the performance of the automobile.

Incidentally, when the battery voltage is reduced in the electric vehicle, it is conceivable that there occurs not only the above problem but also the following problem. That is, when the vehicle travels to rotate the motor generator, an induced voltage is developed by the motor generator. However, if the vehicle speed is high when the battery voltage is low, the induced voltage developed in the motor generator may be higher than the battery voltage. In this case, in order to prevent a current generated by the induced voltage of the motor generator from flowing into the battery, the inverter controls the rotation number of the motor generator to limit the induced voltage developed in the motor generator so that the induced voltage becomes lower than the battery voltage.

However, when a trouble (for example, failure in a diode) occurs in the inverter, the induced voltage thus developed in the motor generator cannot be limited, and the current generated by the induced voltage of the motor generator is allowed to flow into the battery, as a result of which a regenerative torque is generated. This suffers from such a problem that there is a possibility that unintentional deceleration occurs during high-speed travel to extremely deteriorate the stability of the driving.

SUMMARY

It is therefore an object of the invention to provide an electric vehicle that can prevent the unintentional deceleration from occurring even if a trouble occurs in the inverter.

In order to achieve the object, according to the invention, there is provided an electric vehicle comprising: a motor configured to be driven by electric power supplied from a battery; a limit control unit configured to calculate a limit rate for limiting a requested torque requested for the electric vehicle so that an induced voltage developed by the motor is equal to or lower than a voltage of the battery; a drive torque calculation unit configured to calculate a drive torque for traveling the electric vehicle based on the requested torque and the limit rate.

The electric vehicle may further include a motor rotation number detection unit configured to detect a rotation number of the motor. The limit control unit may include: an induced voltage control unit configured to calculate a limited induced voltage which is a voltage equal to or lower than the voltage of the battery; a motor rotation number control unit configured to calculate a largest rotation number based on the limited induced voltage; and a limit rate calculation unit configured to calculate the limit rate based on the rotation number of the motor which is detected by the motor rotation number detection unit and the largest rotation number.

The electric vehicle may further include a vehicle speed detection unit configured to detect a vehicle speed of the electric vehicle. The limit control unit may include: a limited vehicle speed computation unit configured to calculate a limited vehicle speed which is a vehicle speed in a case where the induced voltage is equal to or lower than the voltage of the battery; and a limit rate calculation unit configured to calculate the limit rate based on the vehicle speed of the electric vehicle which is detected by the vehicle speed detection unit and the limited vehicle speed.

BRIEF DESCRIPTION OF THE DRAWINGS

FIG. 3A is a map illustrating a required torque to a vehicle speed and an accelerator opening degree.

FIG. 4A is a map illustrating a target rotation number to the limited induced voltage.

DETAILED DESCRIPTION OF EMBODIMENTS

First Embodiment

A first embodiment of the present invention will be described with reference to FIGS. 1 to 5. In this embodiment, a description will be given of a hybrid electric vehicle (HEV) which is an electric vehicle having an engine and a motor generator.

Figure 1:
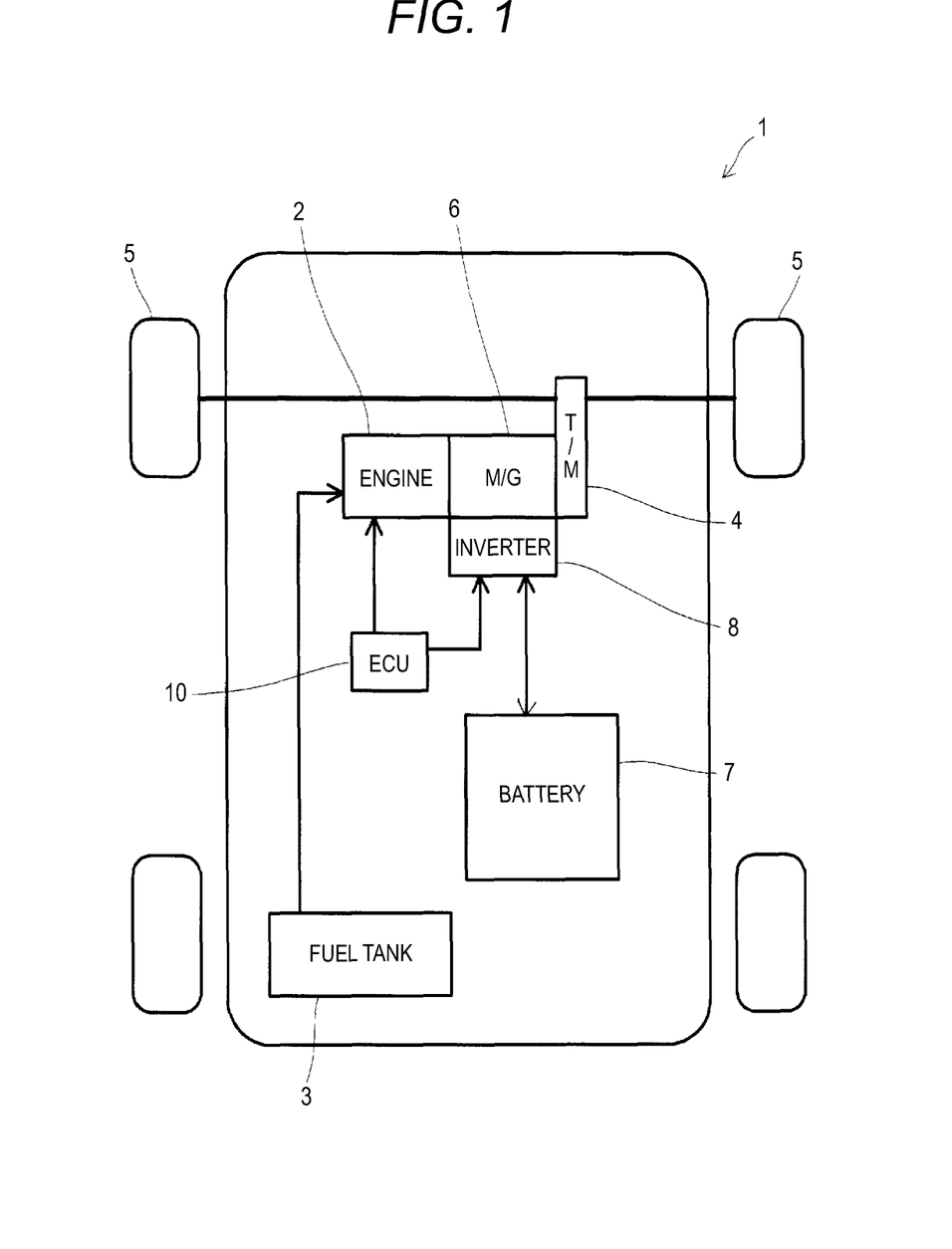
FIG. 1 is a schematic diagram illustrating a hybrid vehicle according to the present invention.

As illustrated in FIG. 1, a vehicle 1 which is an electric vehicle includes an engine 2 for driving. The engine 2 is connected with a fuel tank 3 for supplying a fuel to the engine 2.

The engine 2 is connected to front wheels 5 of the vehicle 1 through a transmission (T/M) 4, and also connected to a motor generator (M/G) 6. The motor generator (M/G) 6 has a function of assisting the engine 2 and supplying a drive force to the vehicle 1, and an electric generator function that conducts a regenerative generation during deceleration.

Also, the vehicle 1 is equipped with a battery 7, and the battery 7 is connected to the motor generator 6 through an inverter 8. Electric power accumulated in the battery 7 is converted into AC from DC by the inverter 8, and flows in the motor generator 6, to thereby drive the motor generator 6. Also, the regenerative electric power during deceleration of the vehicle 1 is converted into DC from AC by the inverter 8, and flows into the battery 7, to thereby charge the battery 7.

Also, the vehicle 1 is equipped with an ECU (electronic control unit) 10 which conducts integrated control of the vehicle 1. The ECU 10 controls, for example, the engine 2 and the inverter 8.

The above vehicle 1 according to this embodiment is a hybrid vehicle of a so-called parallel system, and driven by an output from the motor generator 6, or a total output of the engine 2 and the motor generator 6.

When a battery voltage is low because an SOC (state of charge) of the battery 7 is low, it is conceivable that an induced voltage developed by the motor generator 6 rotated with the travel of the vehicle 1 becomes higher than the battery voltage. The ECU 10 according to this embodiment includes a control device that sets a torque of the vehicle which restricts a requested torque that is requested by the driver so that the induced voltage does not become higher than the battery voltage in this situation, and drives the motor generator 6 based on the torque to travel the vehicle 1. Hereinafter, the control device provided in the ECU 10 will be described in detail with reference to FIG. 2.

Figure 2:
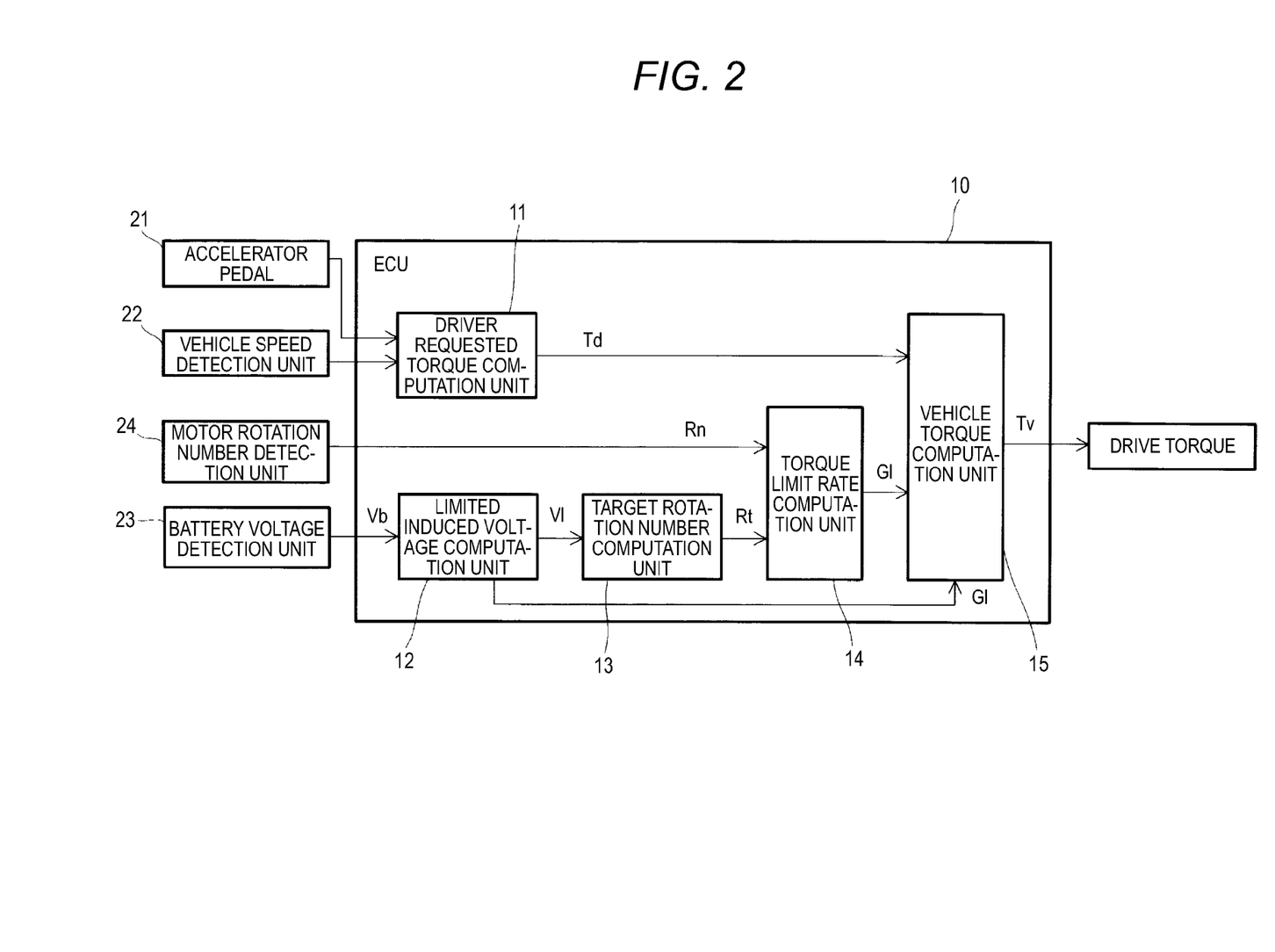
FIG. 2 is a block diagram illustrating an outline configuration of an ECU according to a first embodiment.

As illustrated in FIG. 2, the ECU 10 includes a driver requested torque computation unit 11, a limited induced voltage computation unit (induced voltage control unit) 12, a target rotation number computation unit (motor rotation number control unit) 13, a torque limit rate computation unit (limit rate calculation unit) 14, and a vehicle torque computation unit (drive torque calculation unit) 15.

The driver requested torque computation unit 11 acquires an accelerator opening degree of an accelerator pedal 21 (not shown in FIG. 1) installed within a room of the vehicle. Also, the driver requested torque computation unit 11 acquires a vehicle speed detected by a vehicle speed detection unit (not shown in FIG. 1) 22 that is disposed in the vehicle, and detects a present vehicle speed of the vehicle. Then, the driver requested torque computation unit 11 calculates a requested torque Td requested by the driver from a map illustrated in FIG. 3A based on the acquired vehicle velocity and the acquired accelerator opening degree. In this embodiment, the maps used in control are recorded in a recording unit, which is not shown, of the ECU 10. In this embodiment, the "calculation" includes not only arithmetic calculation but also acquisition of values from the map as described above.

Figure 3A:
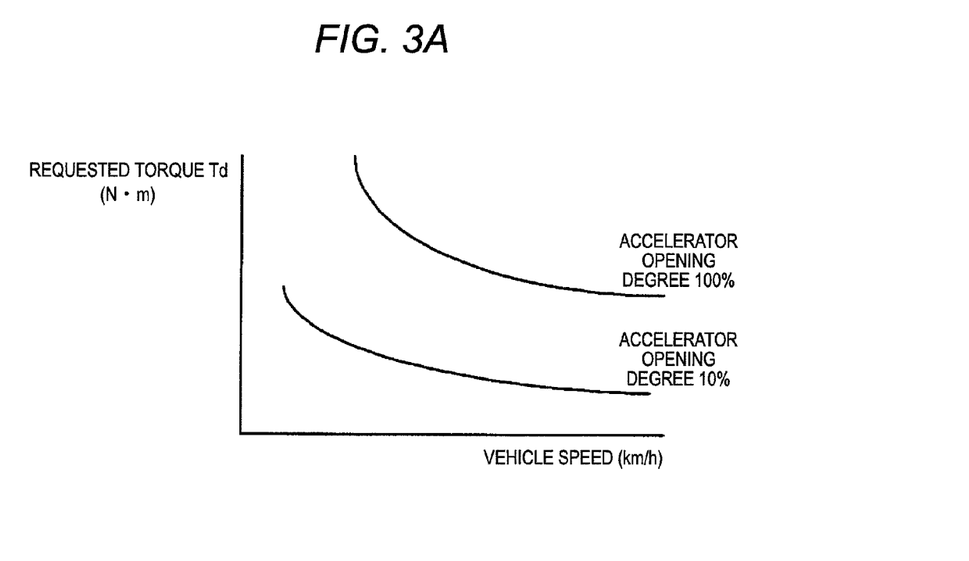

As illustrated in FIG. 3A, the requested torque Td requested by the driver is different in distribution between the case where the accelerator opening degree is 100% and the case where the accelerator opening degree is 10% even if the vehicle speed is the same. However, in both of the cases, while the vehicle speed is low, the requested torque Td is high, and the requested torque Td becomes lower as the vehicle speed is higher. The map illustrated in FIG. 3A exemplifies only the cases where the accelerator opening degree is 100% and the accelerator opening degree is 10%. However, the respective maps are provided for the respective accelerator opening degrees. The driver requested torque computation unit 11 transmits the calculated requested torque Td to the vehicle torque computation unit 15.

The limited induced voltage computation unit 12 acquires a battery voltage Vb from a battery voltage detection unit (not shown in FIG. 1) 23 that detects a voltage of the battery 7 (refer to FIG. 1). Then, the limited induced voltage computation unit 12 determines whether the battery voltage Vb is a determination voltage, which is a threshold value, or lower, or not. If the battery voltage Vb is larger than the determination voltage, the limited induced voltage computation unit 12 transmits a fact that a limit rate (limit factor) Gl to be described in detail later is 1, to the vehicle torque computation unit 15.

If the battery voltage Vb is the determination voltage or lower, because the battery voltage Vb is sufficiently small, there is a possibility that the induced voltage exceeds the battery voltage Vb. Therefore, as described below, a control for limiting the induced voltage starts. Then, the limited induced voltage computation unit 12 computes a limited induced voltage Vl in the present status from the battery voltage Vb by using the map illustrated in FIG. 3B when the battery voltage Vb is the determination voltage or lower.

The limited induced voltage Vl means the largest value of a voltage (a voltage equal to or lower than the battery voltage) that does not exceed the battery voltage. That is, the limited induced voltage computation unit 12 calculates the acceptable largest induced voltage that does not exceed the battery voltage from the present battery voltage. The limited induced voltage computation unit 12 sets the rotation number of the motor generator based on the largest induced voltage, with the result that the control device can limit the rotation number of the motor generator so that the induced voltage does not exceed the battery voltage.

Figure 3B:
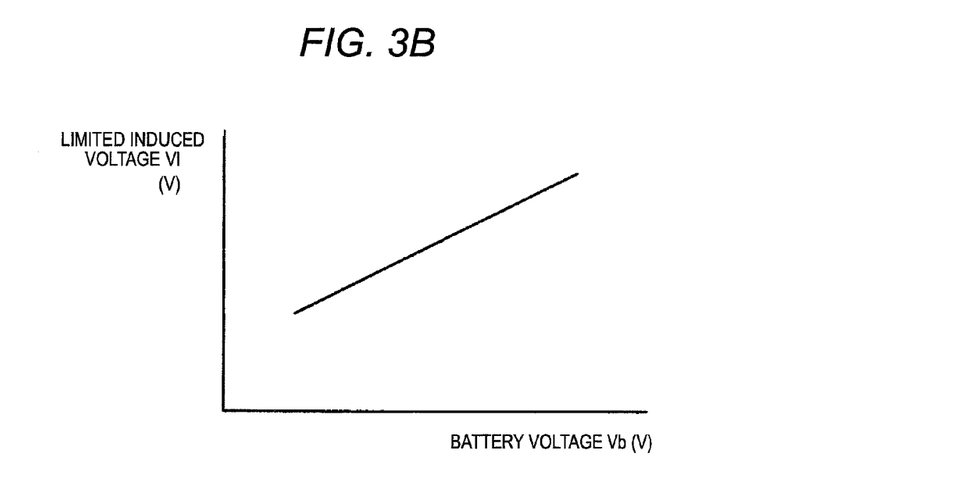
FIG. 3B is a map illustrating a limited induced voltage to a battery voltage, according to the first embodiment.

Theoretically, the limited induced voltage Vl matches the battery voltage Vb. However, in this embodiment, as illustrated in FIG. 3B, a gradient of the limited induced voltage Vl to the battery voltage Vb is slightly smaller than 1. That is, the limited induced voltage Vl is set with tolerance to be slightly smaller than the battery voltage Vb, and the induced voltage is prevented from becoming higher than the battery voltage Vb, with the result that the current does not flow into the battery from the motor generator when the inverter fails. The limited induced voltage computation unit 12 transmits the limited induced voltage Vl to the target rotation number computation unit 13.

Figure 4A:
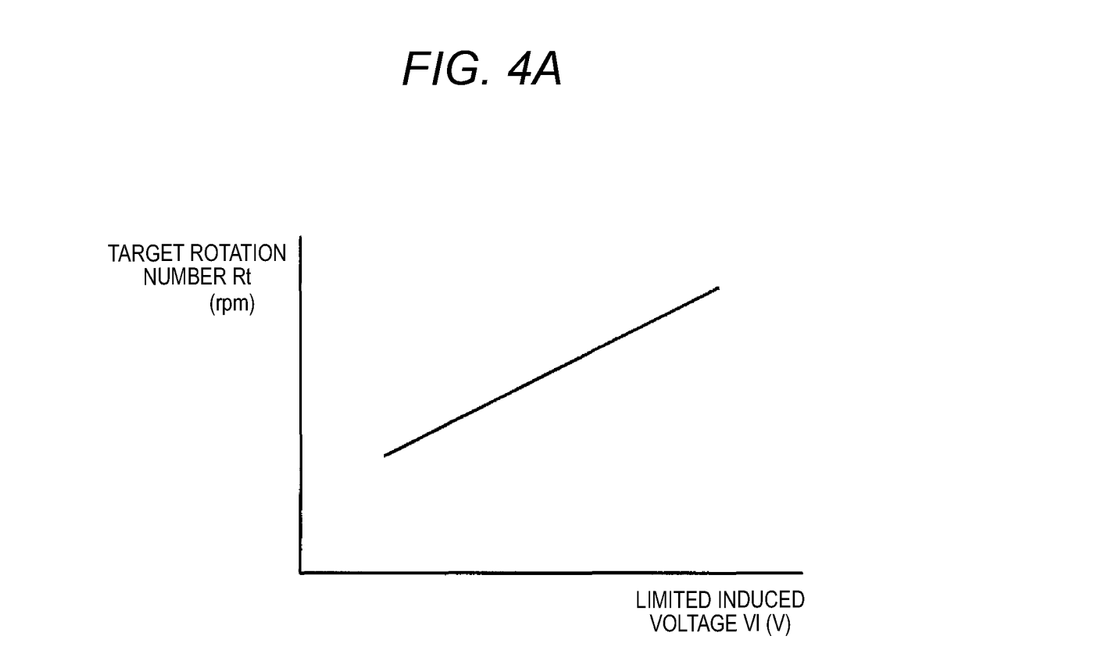

The target rotation number computation unit 13 calculates a target rotation number (largest rotation number) Rt from the acquired limited induced voltage Vl by using a map illustrated in FIG. 4A. The target rotation number Rt means a rotation number of the motor generator when a voltage value of the induced voltage developed by the rotation of the motor generator with the rotation of the engine becomes the limited induced voltage Vl. As illustrated in FIG. 4A, the target rotation number Rt is set to be lower as the limited induced voltage Vl is smaller. Then, the target rotation number computation unit 13 controls the rotation of the motor generator within the target rotation number or lower, and transmits the target rotation number Rt to the torque limit rate computation unit 14.

The torque limit rate computation unit 14 acquires a motor rotation number Rn detected by a motor rotation number detection unit (not shown in FIG. 1) 24 that detects the motor rotation number which is the present rotation number of the motor generator. The torque limit rate computation unit 14 subtracts the motor rotation number Rn from the target rotation number Rt acquired from the target rotation number computation unit 13 to calculate a rotation number margin value Rm (that is, Rm=Rt−Rn). The torque limit rate computation unit 14 calculates the limit rate Gl of the torque from the rotation number margin value Rm by using a map illustrated in FIG. 4B. In this example, the limit rate Gl is indicative of how much the present requested torque requested by the driver needs to be limited so that the induced voltage does not exceed the battery voltage. If the limit rate Gl is 1, there is no need to limit the requested torque, and as the limit rate Gl is smaller than 1, there is a need to limit the requested torque more. For example, if the limit rate Gl is 1, 100% of the requested torque is the vehicle torque, and if the limit rate Gl is 0.2, 20% of the requested torque is the vehicle torque.

Figure 4B:
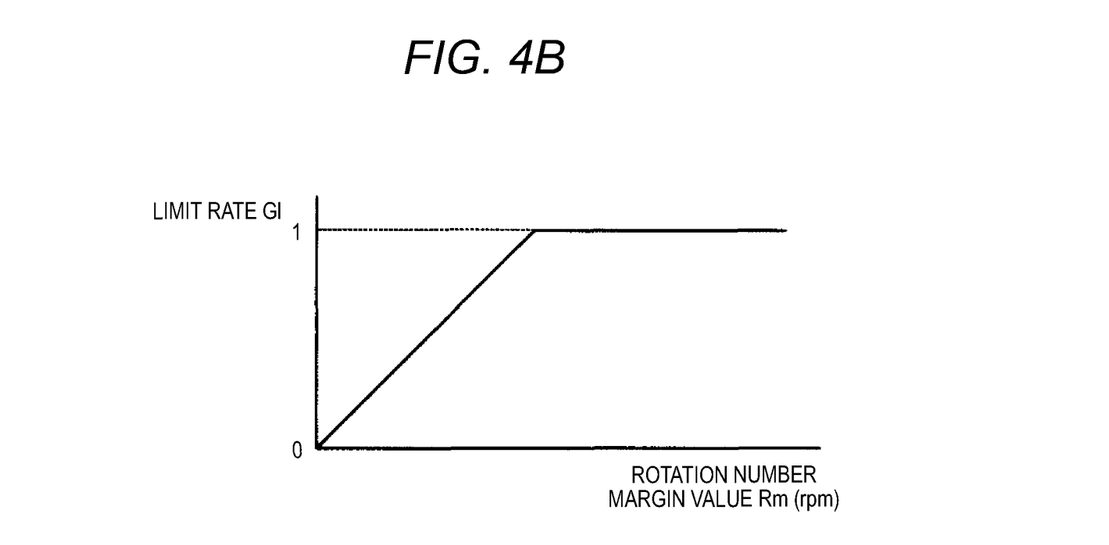
FIG. 4B is a map illustrating a torque limit rate to a rotation number margin value, according to the first embodiment.

As illustrated in FIG. 4B, the limit rate Gl becomes larger in a range from 0 to a given value as the rotation number margin value Rm becomes larger, and approaches 1. After the limit rate Gl becomes 1, the limit rate Gl is not varied even if the rotation number margin value Rm becomes larger.

That is, when the rotation number margin value Rm is large, since the induced voltage developed by the present rotation number of the motor generator is remarkably smaller than the limit induced voltage, there is no need to limit the requested torque. Accordingly, the limit rate Gl becomes 1. Also, when the rotation number margin value Rm is small, since the induced voltage developed by the present rotation number of the motor generator is close to the limited induced voltage, there is a need to limit the requested torque. Accordingly, the limit rate Gl is set to 1 or lower in accordance with the rotation number margin value Rm. The torque limit rate computation unit 14 transmits the limit rate Gl to the vehicle torque computation unit 15.

The vehicle torque computation unit 15 calculates a vehicle torque Tv from the requested torque Td, which is acquired from the driver requested torque computation unit 11, and the limit rate Gl, which is acquired from the torque limit rate computation unit 14. That is, the vehicle torque computation unit 15 multiplies the requested torque Td by the limit rate Gl to calculate the vehicle torque Tv (Tv=Td×Gl). The ECU 10 supplies the calculated vehicle torque Tv to the engine and the motor generator as the drive torque in accordance with the drive state of the vehicle. The drive torque limits the requested torque Td so that the induced voltage developed by the rotation of the motor generator does not exceed the battery voltage as described above. Therefore, the induced voltage developed by the rotation of the engine according to the drive torque does not exceed the battery voltage. Accordingly, even if a trouble occurs in the inverter 8, unintentional deceleration can be prevented from occurring.

Figure 5:
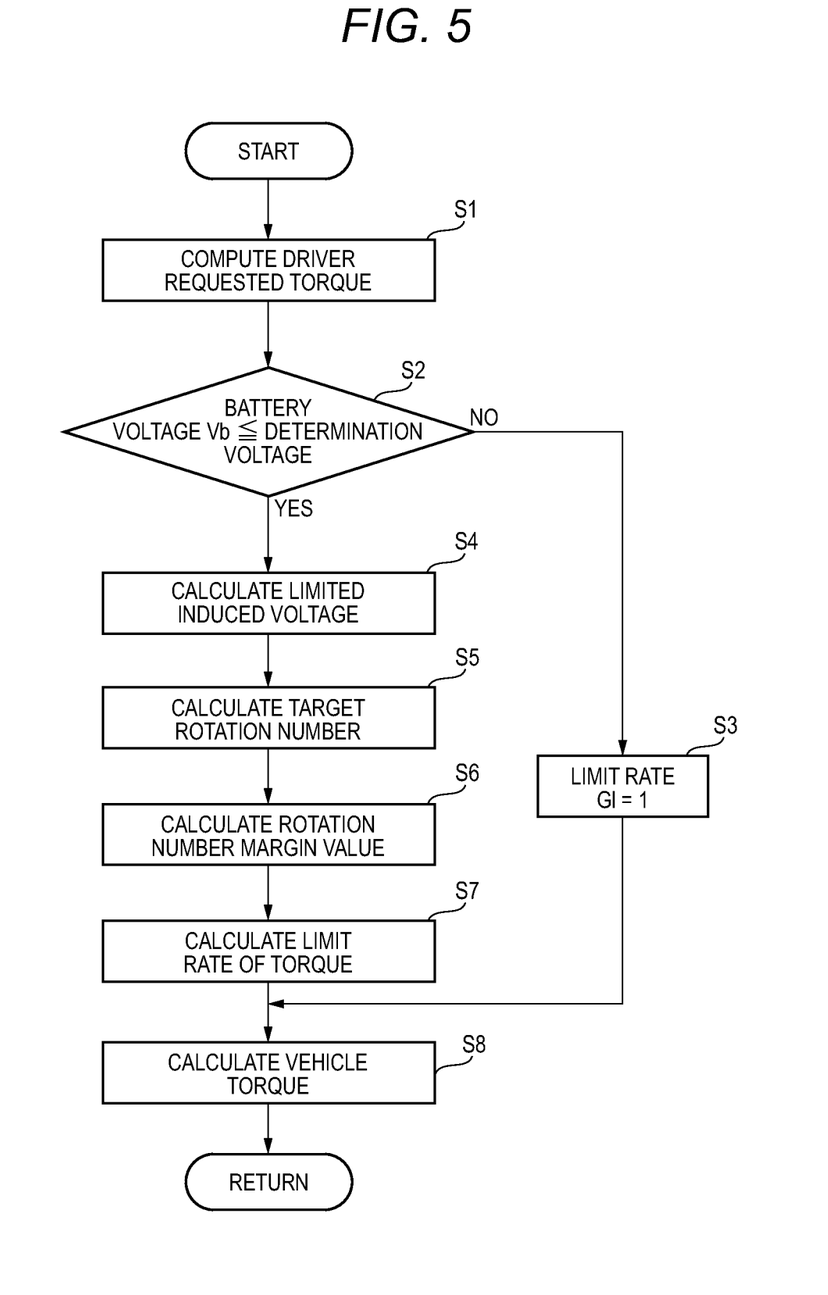
FIG. 5 is a flowchart illustrating a control process according to the first embodiment.

Hereinafter, the operation of the control device will be further described with reference to FIG. 5 which is a flowchart.

The control device starts the control every given moment while the vehicle travels. When the control starts, the control device first calculates the requested torque Td by the driver requested torque computation unit 11 in Step S1. The processing is advanced to Step S2.

In Step S2, the limited induced voltage computation unit 12 determines whether the battery voltage Vb is the determination voltage or lower, or not. Then, if the battery voltage Vb is higher than the determination voltage (no), the processing is advanced to Step S3. If the battery voltage Vb is equal to or lower than the determination voltage (yes), the processing is advanced to Step S4.

In Step S3, the limited induced voltage computation unit 12 sets the limit rate Gl of the torque to 1. The processing is advanced to Step S8.

In Step S4, the limited induced voltage computation unit 12 calculates the limited induced voltage Vl from the battery voltage Vb. The processing is advanced to Step S5.

In Step S5, the target rotation number computation unit 13 calculates the target rotation number Rt from the limited induced voltage Vl. The processing is advanced to Step S6.

In Step S6, the torque limit rate computation unit 14 subtracts the motor rotation number Rn from the target rotation number Rt to calculate the rotation number margin value Rm. The processing is advanced to Step S7.

In Step S7, the torque limit rate computation unit 14 calculates the limit rate Gl of the torque from the rotation number margin value Rm. The processing is advanced to Step S8.

In Step S8, the vehicle torque computation unit 15 calculates the vehicle torque Tv from the limit rate Gl and the requested torque Td. With the above processing, the control is completed. The ECU 10 sets the drive torque of the vehicle based on the vehicle torque Tv, and drives the engine and the motor generator in accordance with the set drive torque.

The control device repeats the above control so as to set the vehicle torque Tv so that the induced voltage developed by the motor generator becomes always lower than the battery voltage when the vehicle travels.

As described above, with the control conducted by the ECU 10 illustrated in FIG. 1, even if a trouble occurs in the inverter 8, since the induced voltage of the motor generator 6 is always lower than the voltage of the battery 7, a current caused by the induced voltage does not flow into the battery 7. As a result, since a regenerative torque does not occur, for example, during the high speed drive, no unintentional deceleration occurs.

That is, the rotation number of the motor generator is controlled by the inverter so that the induced voltage falls below the battery voltage, when the vehicle travels at a high speed. Even if the highest speed is limited in accordance with the battery voltage, the drive (that is, vehicle speed) of the engine is not limited in accordance with the induced voltage. However, when the vehicle speed is not thus limited, if a trouble occurs in the inverter, the induced voltage developed by the motor generator becomes higher than the battery voltage. As a result, a current may flow into the battery from the motor generator to generate a regenerative torque.

When the control is conducted by the ECU 10 according to this embodiment, the vehicle speed is limited to reduce the rotation number of the engine, and the induced voltage of the motor generator synchronous with the engine also becomes lower. In this way, since the induced voltage of the motor generator is always lower than the battery voltage, the generation of the regenerative torque can be prevented. As a result, the stability of the vehicle can be ensured.

In this embodiment, the torque limit rate that limits the requested torque is set, and the vehicle torque is set based on the torque limit rate, thereby determining the vehicle speed. As a result, even if acceleration cannot be conducted as high as that requested by the driver, deceleration does not occur due to the regenerative torque. Accordingly, since the regenerative torque does not occur, for example, during the high speed drive, no unintentional deceleration occurs.

Second Embodiment

Another embodiment of the present invention will be described with reference to FIGS. 6 to 9. In FIGS. 6 to 9, the same constituent elements as those in FIGS. 1 to 5 are denoted by identical reference symbols.

Figure 6:
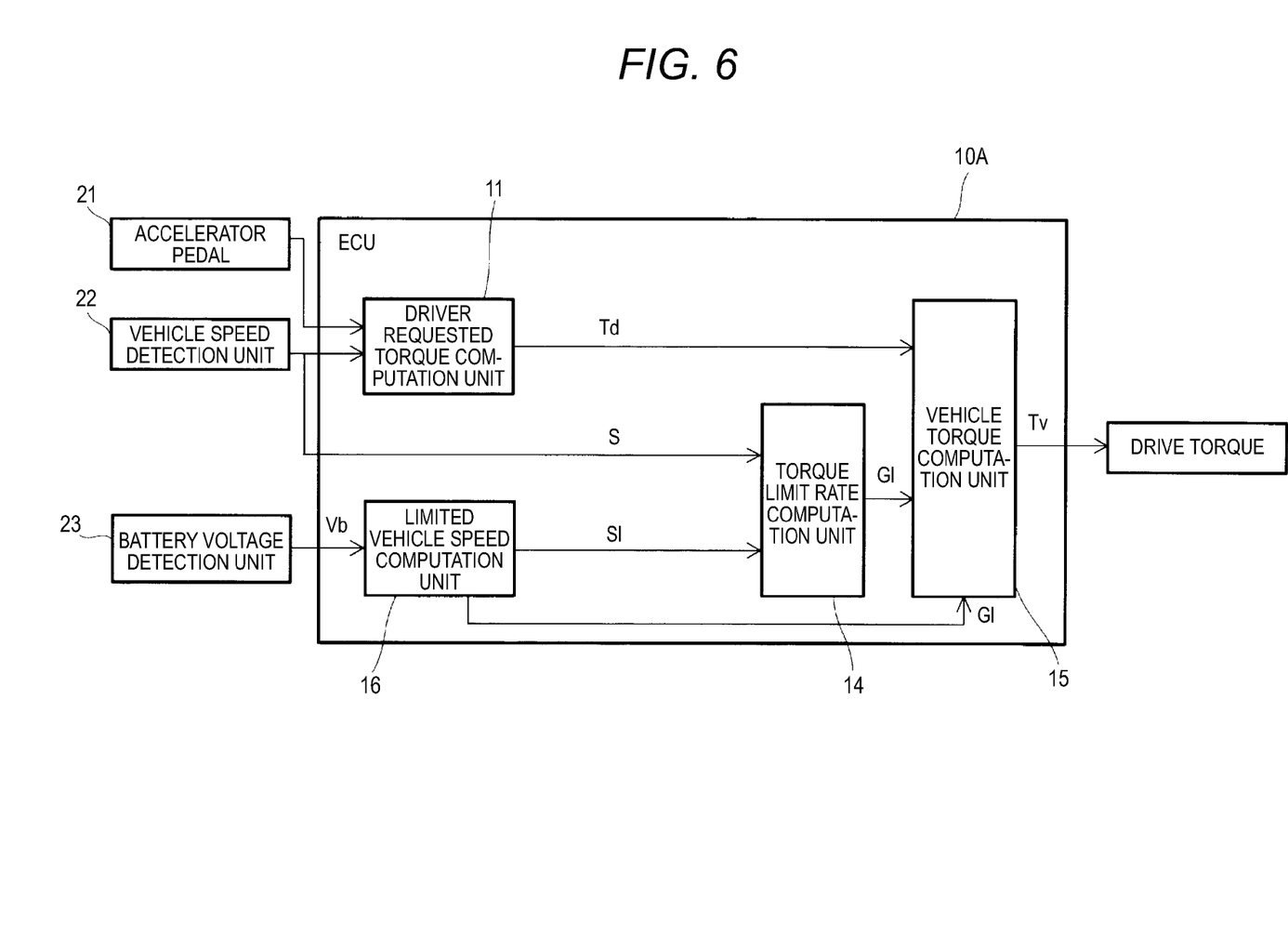
FIG. 6 is a block diagram illustrating an outline configuration of an ECU according to a second embodiment.

As illustrated in FIG. 6, this embodiment is different from the first embodiment in that an ECU 10A includes a limited vehicle speed computation unit (limited vehicle speed calculation unit) 16 instead of the limited induced voltage computation unit 12 (refer to FIG. 2) and the target rotation number computation unit 13 (refer to FIG. 2) in the first embodiment. Hereinafter, a configuration of the ECU 10A will be described in detail.

The ECU 10A includes the driver requested torque computation unit 11, the limited vehicle speed computation unit 16, the torque limit rate computation unit 14, and the vehicle torque computation unit 15.

The driver requested torque computation unit 11 calculates the requested torque Td from the accelerator pedal 21 and the vehicle speed detection unit 22, and transmits the requested torque Td to the vehicle torque computation unit 15, as with the first embodiment.

The limited vehicle speed computation unit 16 acquires the battery voltage Vb from the battery voltage detection unit (not shown in FIG. 1) 23 that detects the voltage of the battery 7 (refer to FIG. 1). Then, the limited vehicle speed computation unit 16 determines whether the battery voltage Vb is a determination voltage, which is a threshold value, or lower, or not. If the battery voltage Vb is larger than the determination voltage, the limited vehicle speed computation unit 16 transmits a fact that a limit rate (limit factor) Gl to be described in detail later is 1, to the vehicle torque computation unit 15.

If the battery voltage Vb is the determination voltage or lower, because the battery voltage Vb is sufficiently small, there is a possibility that the induced voltage exceeds the battery voltage Vb. Therefore, as described below, a control for limiting the induced voltage starts. Then, the limited vehicle speed computation unit 16 computes a limited vehicle speed S1 in the present status from the battery voltage Vb by using a map illustrated in FIG. 7 when the battery voltage Vb is the determination voltage or lower.

The limited vehicle speed S1 means a vehicle speed in the case of the largest value of a voltage (a voltage equal to or lower than the battery voltage) that does not exceed the battery voltage. That is, the limited vehicle speed computation unit 16 calculates the vehicle speed in the case of the acceptable largest induced voltage that does not exceed the battery voltage from the present battery voltage. The limited vehicle speed computation unit 16 sets the vehicle speed based on the largest induced voltage, with the result that the control device can limit the requested torque so that the induced voltage does not exceed the battery voltage.

Figure 7:
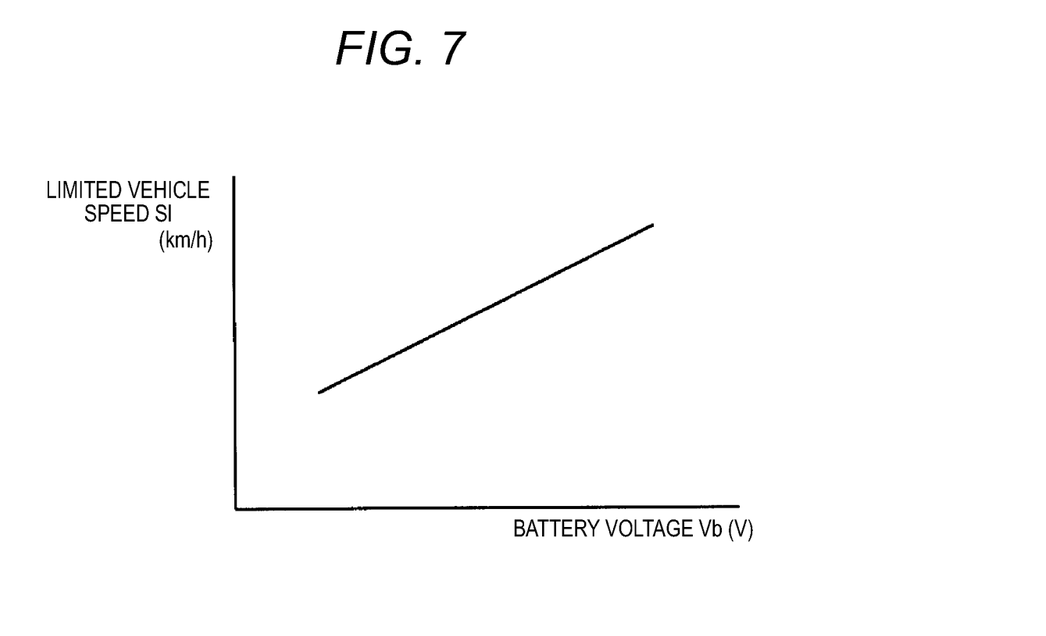
FIG. 7 is a map illustrating a limited vehicle speed to a battery voltage according to the second embodiment.

As illustrated in FIG. 7, in the map indicative of the limited vehicle speed S1 to the battery voltage Vb, the limited vehicle speed S1 becomes higher as the battery voltage Vb is higher. The limited vehicle speed computation unit 16 transmits the limited vehicle speed S1 to the torque limit rate computation unit 14.

The torque limit rate computation unit 14 acquires a vehicle speed S detected by the vehicle speed detection unit 22. Then, the torque limit rate computation unit 14 subtracts the vehicle speed S from the limited vehicle speed S1 acquired from the limited vehicle speed computation unit 16 to calculate a vehicle speed margin value Sm (that is, Sm=S1−S). The torque limit rate computation unit 14 calculates the limit rate Gl of the torque from the calculated vehicle margin value Sm by using a map illustrated in FIG. 8.

Figure 8:
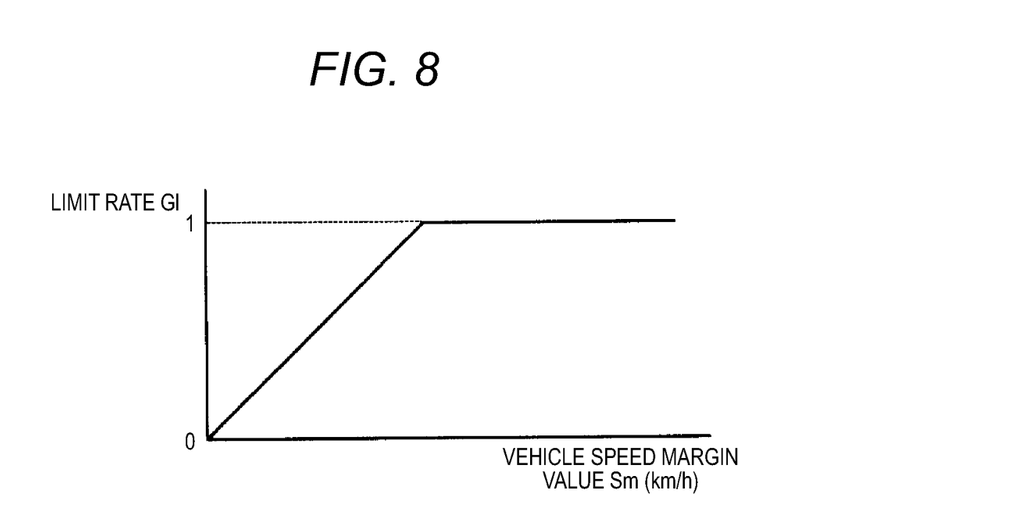
FIG. 8 is a map illustrating a torque limit rate to the vehicle speed margin value according to the second embodiment.

As illustrated in FIG. 8, the limit rate Gl becomes larger in a range from 0 to a given value as the vehicle speed margin value Sm becomes larger, and approaches 1. After the limit rate Gl becomes 1, the limit rate Gl is not varied even if the vehicle speed margin value Sm becomes larger.

That is, when the vehicle speed margin value Sm is large, since the induced voltage developed by the present rotation number of the motor generator is remarkably smaller than the limit induced voltage, there is no need to limit the requested torque. Accordingly, the limit rate Gl becomes 1. Also, when the vehicle speed margin value Sm is small, since the induced voltage developed by the present rotation number of the motor generator is close to the limited vehicle speed, there is a need to limit the requested torque. Accordingly, the limit rate is set to 1 or lower in accordance with the vehicle speed margin value Sm. The torque limit rate computation unit 14 transmits the limit rate Gl to the vehicle torque computation unit 15.

The vehicle torque computation unit 15 calculates a vehicle torque Tv from the requested torque Td, which is acquired from the driver requested torque computation unit 11, and the limit rate Gl, which is acquired from the torque limit rate computation unit 14, as with the first embodiment. The ECU 10A supplies the calculated vehicle torque Tv to the engine and the motor generator as the drive torque in accordance with the drive state of the vehicle. Similarly, in this embodiment, as with the first embodiment, the drive torque limits the requested torque Td so that the induced voltage developed by the rotation of the motor generator does not exceed the battery voltage as described above. Therefore, the induced voltage developed by the rotation of the engine in accordance with the drive torque does not exceed the battery voltage. As a result, even if a trouble occurs in the inverter 8, unintentional deceleration can be prevented from occurring.

Figure 9:
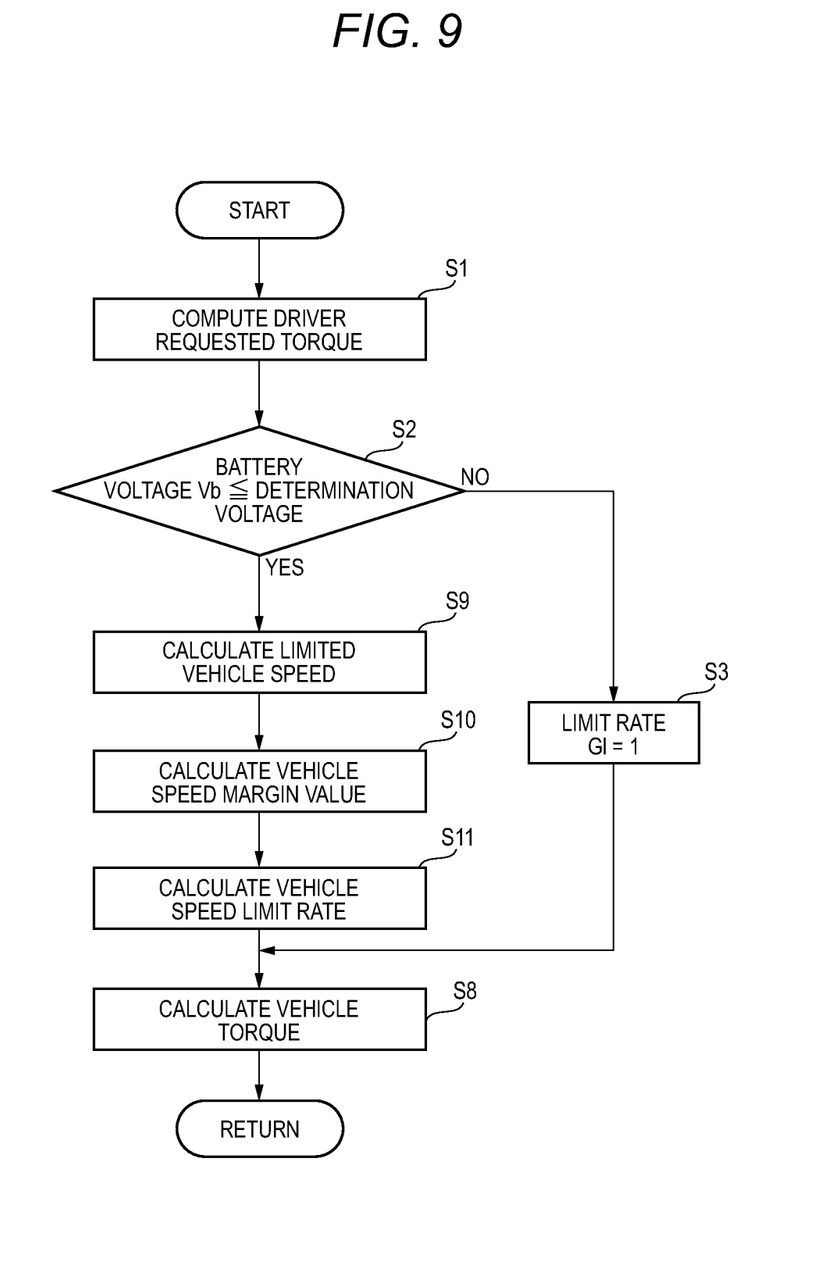
FIG. 9 is a flowchart illustrating a control process according to the second embodiment.

Hereinafter, the operation of the control device will be further described with reference to FIG. 9 which is a flowchart.

The control device starts the control every given moment while the vehicle travels by a drive force of only the engine. First, in Step S1, the control device calculates the requested torque Td by the driver requested torque computation unit 11 as with the first embodiment. The processing is advanced to Step S2.

In Step S2, the limited vehicle speed computation unit determines whether the battery voltage Vb is the determination voltage or lower, or not. Then, if the battery voltage Vb is higher than the determination voltage (no), the processing is advanced to Step S3. If the battery voltage Vb is equal to or lower than the determination voltage (yes), the processing is advanced to Step S4.

In Step S3, the limited vehicle speed computation unit 16 sets the limit rate Gl of the torque to 1. The processing is advanced to Step S8.

In Step S9, the limited vehicle speed computation unit 16 calculates the limited vehicle speed S1 from the battery voltage Vb. The processing is advanced to Step S10.

In Step S10, the torque limit rate computation unit 14 subtracts the vehicle speed S from the limited vehicle speed S1 to calculate the vehicle speed margin value Sm. The processing is advanced to Step S11.

In Step 11, the torque limit rate computation unit 14 calculates the limit rate Gl from the vehicle speed margin value Sm. The processing is advanced to Step S8.

In Step S8, the vehicle torque computation unit 15 calculates the vehicle torque Tv from the limit rate Gl and the requested torque Td. With the above processing, the control is completed.

The control device repeats the above control so as to set the vehicle torque Tv from the vehicle speed so that the induced voltage becomes lower than the battery voltage, based on a state of the battery when the vehicle travels.

Similarly, in this embodiment, the above control is conducted by the ECU 10A illustrated in FIG. 6 to limit the drive torque of the engine and the motor generator, to thereby also reduce the induced voltage of the motor generator. In this way, since the induced voltage of the motor generator is always lower than the battery voltage, the regenerative torque can be prevented from occurring. As a result, the stability of the vehicle can be ensured.

As described above, in the present invention, when the battery voltage is reduced without using the inverter, the ECU 10A limits the vehicle torque so that the induced voltage of the motor generator does not exceed the battery voltage. The above control according to the present invention is conducted by using the vehicle speed in this embodiment as described above, and also conducted by using the rotation number of the motor generator in the first embodiment. Accordingly, the control can be easily and efficiently conducted.

In the above-mentioned respective embodiments, the torque limit rate is obtained, and the requested torque is limited based on the torque limit rate. However, the present invention is not limited to the above configuration. The requested torque needs to be limited so that the induced voltage generated by the motor generator does not exceed the battery voltage. For example, the vehicle torque can be obtained by, for example, always multiplying the requested torque by 0.8.

In the above-mentioned respective embodiments, the control is conducted every given moment during travel. However, the present invention is not limited to this configuration. For example, the control may be conducted only when a failure determination of the inverter is conducted during the engine travel. When the electric vehicle is thus configured, even if the inverter fails, since the induced voltage of the motor generator is always lower than the battery voltage, the regenerative torque can be prevented from occurring.

Also, in the above-mentioned respective embodiments, each of the limited vehicle speed and the limited induced voltage is set to the acceptable maximum value in which the induced voltage does not exceed the battery voltage. However, the present invention is not limited to this configuration. The limited vehicle speed and the limited induced voltage may not be the maximum values if the induced voltage is an acceptable value that does not exceed the battery voltage. However, the maximum value is advantageous in that the limit of the vehicle speed is the smallest.

In the above-mentioned embodiments, the voltage of the battery is detected, and the induced voltage is controlled based on the battery voltage. Alternatively, the induced voltage may be controlled by setting the target induced voltage according to the SOC of the battery.

Further, in the above respective embodiments, the hybrid vehicle has been described. However, the present invention is not limited to the hybrid vehicle. For example, the present invention can be also applied to an electric automobile having no engine.

According to an aspect of the invention, the rotation number of the motor is always controlled so that the induced voltage developed by the motor generator does not exceed the voltage of the battery. As a result, even if the inverter fails, an unstable torque variation of the vehicle, which is caused by a reverse current flowing into the battery from the motor generator, can be avoided without allowing the induced voltage to exceed the voltage of the battery.

According to an aspect of the invention, extreme deceleration can be prevented from occurring even if a trouble occurs in the inverter.

What is claimed is:

1. An electric vehicle comprising:
    a motor configured to be driven by electric power supplied from a battery;
    a battery voltage detection unit configured to detect a voltage of the battery;
    a motor rotation number detection unit configured to detect a rotation number of the motor;
    a motor rotation number control unit configured to calculate a largest rotation number with which an induced voltage developed by the motor is equal to or lower than the voltage of the battery;
    a limit control unit configured to calculate a limit factor for limiting a requested torque requested for the electric vehicle so that the rotation number of the motor is equal to or lower than the largest rotation number; and
    a drive torque calculation unit configured to calculate a drive torque for traveling the electric vehicle based on the requested torque and the limit factor.

2. The electric vehicle according to claim 1, further comprising:
    an engine configured to drive the electric vehicle,
    wherein the calculated drive torque is also supplied to the engine.

3. The electric vehicle according to claim 1, wherein a limited induced voltage is determined from a map based on the detected voltage of the battery.

4. The electric vehicle according to claim 3, wherein, in the motor rotation number control unit, the largest rotation number is determined from a first map based on the limited induced voltage.

5. The electric vehicle according to claim 4, wherein a limit factor calculation unit calculates a rotation number margin value based on a difference between the largest rotation number and the rotation number of the motor.

6. The electric vehicle according to claim 5, wherein, in the limit factor calculation unit, the limit factor is determined from a second map based on the rotation number margin value.

7. An electric vehicle comprising:
    a battery voltage detection unit that detects a voltage of a battery;
    a requested torque calculating unit that calculates a requested torque for the electric vehicle based on a depression amount of an accelerator pedal and a vehicle speed;
    a motor configured to be driven by electric power supplied from a battery to drive the electric vehicle;
    a limit control unit configured to receive the detected voltage of the battery and calculate a limit factor based on a calculated limited vehicle speed for limiting the requested torque requested for the electric vehicle so that an induced voltage developed by the motor is equal to or lower than the detected voltage of the battery,
        the limit control unit including a limited vehicle speed computation unit that receives the detected voltage of the battery from the battery voltage detection unit to determine whether the detected voltage is smaller than a threshold voltage, and calculating the limited vehicle speed based solely on the detected voltage when the detected voltage is equal to or lower than the threshold voltage; and
    a drive torque calculation unit configured to receive the requested torque and the limit factor to calculate a drive torque supplied to the motor for traveling the electric vehicle based on the requested torque and the limit factor.

8. The electric vehicle according to claim 7, further comprising:
a vehicle speed detection unit configured to detect the vehicle speed of the electric vehicle, wherein
the limit control unit includes:
a limit factor calculation unit configured to calculate the limit factor based on the vehicle speed of the electric vehicle which is detected by the vehicle speed detection unit and the limited vehicle speed.

9. The electric vehicle according to claim 7, further comprising:
an engine configured to drive the electric vehicle, wherein the calculated drive torque is also supplied to the engine.

10. The electric vehicle according to claim 7, wherein, the limit factor calculation unit calculates a vehicle speed margin value based on a difference between the limited vehicle speed and the vehicle speed.

11. The electric vehicle according to claim 10, wherein, in the limit factor calculation unit, the limit factor is determined from a map based on the vehicle speed margin value.

\* \* \* \* \*